(12) United States Patent
Balakrishnan et al.

(10) Patent No.: US 9,438,501 B2
(45) Date of Patent: *Sep. 6, 2016

(54) MULTI-SCALE NETWORK TRAFFIC GENERATOR

(75) Inventors: Ganesh Balakrishnan, Morrisville, NC (US); Jorge R. Rodriguez, Cary, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 1493 days.

This patent is subject to a terminal disclaimer.

(21) Appl. No.: 11/465,851

(22) Filed: Aug. 21, 2006

(65) Prior Publication Data

US 2008/0043748 A1    Feb. 21, 2008

(51) Int. Cl.
*H04L 12/26* (2006.01)
*H04L 12/24* (2006.01)

(52) U.S. Cl.
CPC ............ *H04L 43/50* (2013.01); *H04L 41/145* (2013.01)

(58) Field of Classification Search
CPC ...................................................... H04L 47/10
USPC ............... 370/229, 235, 252, 351, 395, 400; 379/90; 455/76; 709/223
See application file for complete search history.

(56) References Cited

U.S. PATENT DOCUMENTS

| | | | |
|---|---|---|---|
| 5,343,465 A | 8/1994 | Khalil | |
| 2004/0208127 A1 | 10/2004 | Rodriguez et al. | |
| 2004/0208131 A1* | 10/2004 | Rodriguez et al. | ........... 370/252 |
| 2005/0025054 A1* | 2/2005 | D. et al. | ......................... 370/235 |
| 2005/0180444 A1 | 8/2005 | Gu et al. | |
| 2005/0226238 A1 | 10/2005 | Hoskote et al. | |
| 2008/0043748 A1 | 2/2008 | Balakrishnan et al. | |

OTHER PUBLICATIONS

U.S. Appl. No. 12/131,695; Non-Final Office Action dated Apr. 13, 2010.

* cited by examiner

*Primary Examiner* — Samina Choudhry
(74) *Attorney, Agent, or Firm* — Steven M. Greenberg, Esq.; CRGO LAW

(57) ABSTRACT

Embodiments of the present invention provide a method, system and computer program product for multi-scale network traffic generation. In one embodiment of the invention, a network traffic generation method can be provided. The method can include defining multiple, different scales in an n-state MMPP model to accommodate a full characteristic response of a modeled traffic scenario. The method further can include establishing a transition window for each of the scales and determining a state through the transition window for selected ones of the scales. Finally, the method can include computing an inter-packet time according to the determined state for each of the selected ones of the scales and generating and transmitting packets for the selected ones of the scales utilizing a correspondingly computed inter-packet time.

7 Claims, 2 Drawing Sheets

MULTI-SCALE NETWORK TRAFFIC GENERATOR

BACKGROUND OF THE INVENTION

1. Field of the Invention

The present invention relates to the field of network traffic generation and more particularly to the field of network traffic generation for different scales of operation.

2. Description of the Related Art

Traffic generation for packet switched networks refers to the injection of artificially generated packet streams into a target network with a traffic pattern according to a stochastic specification or trace. Typically, traffic generation supports the testing of a network application or an underlying network under exemplary load conditions to determine application or network response characteristics to the load. Synthetic traffic generation based upon a stochastic specification enables the creation of arbitrary workloads for a network, while trace-based traffic generation allows for the reproduction of a known traffic pattern. Notably, traffic generation facilitates the testing and study of the performance characteristics of a network application or system without incurring the substantial cost of hard and soft equipment and human testers that otherwise would be required.

Network traffic is known to be bursty in nature. Traffic burstiness has been defined as the tendency of data packets to arrive in bursts, with the inter-packet arrival time within the burst being much smaller than the average inter-packet arrival time. Bursty traffic can have a significant effect on the queuing delays and response times of a network application or network system. As such, an appropriate measure of burstiness can serve as an important traffic parameter describing the variability in load intensity and packet arrival rate in a network system.

Bursty network traffic historically has been characterized as Poisson distributed and the modeling, analysis and the design parameters of traffic generation systems tend to abide by this assumption. Notwithstanding, recent studies indicate that network traffic not only is bursty in nature, but also network traffic has been found to be self-similar in nature. Self-similarity as described in the seminal paper, Leland, Taqqu, Willinger and Wilson, *On the Self-Similar Nature of Ethernet Traffic*, in IEEE/ACM Transactions on Networking, vol. 2, no. 1 (February 1994), is a process displaying structural similarities across a wide range of scales of a specific dimension. In other words, the reference structure repeats itself over a wide range of scales of diverse dimensions (geometrical, or statistical, or temporal), and the statistics of the process do not change with the change.

Burstiness in self-similar network traffic most often has been modeled according to a Markov modulated Poisson process (MMPP). The MMPP model describes two exponentially distributed states: idle and bursty. The transition from the idle state to the bursty state in the MMPP model depends upon the size of the required bursts which can be constant or exponentially distributed. To produce network traffic according to the MMPP model, one need only specify three parameters: interpacket gap (IPG), packet size and the size of the burst. A fourth, optional parameter can be specified as a "spread" to increase the variability of the generated data as it is well known in the art.

BRIEF SUMMARY OF THE INVENTION

Embodiments of the present invention address deficiencies of the art in respect to traffic generation for self-similar network traffic and provide a novel and non-obvious method, system and computer program product for multi-scale network traffic generation. In one embodiment of the invention, a network traffic generation method can be provided. The method can include defining multiple, different scales in an n-state MMPP model to accommodate a full characteristic response of a modeled traffic scenario by comparing in the transition matrix a random probability distribution to the transition window to determine the state. The method further can include establishing a transition window for each of the scales and determining a state through the transition window for selected ones of the scales. Finally, the method can include computing an inter-packet time according to the determined state for each of the selected ones of the scales and generating and transmitting packets for the selected ones of the scales utilizing a correspondingly computed inter-packet time.

In another embodiment of the invention, a network traffic generation data processing system can be provided. The system can include an MMPP model and a packet scheduler coupled to the MMP model. The system further can include a data store of transition windows defined for different defined scales and traffic generation parameter computing logic. The traffic generation parameter computing logic can include program code enabled to compute traffic generation parameters for different scales according to respective states identified within different transition windows in the data store for the different scales. Finally, the system can include a packet transmitter coupled to the packet scheduler.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for multi-scale, multi-window network traffic generation. In accordance with an embodiment of the present invention, a multi-scale, multi-window network traffic generator can simulate the self-similar characteristics of an inter-arrival time distribution for packets simulated for arrival across multiple time scales. The traffic generator can operate upon an adapted, n-state MMPP model with transition windows to identify state transitions in each of the time scales. Specifically, each of the transition windows can map a gap between multiple scales of a self-similar inter-packet time distribution to facilitate the selection of parameter values when generating packets within a particular time scale.

Figure 1:
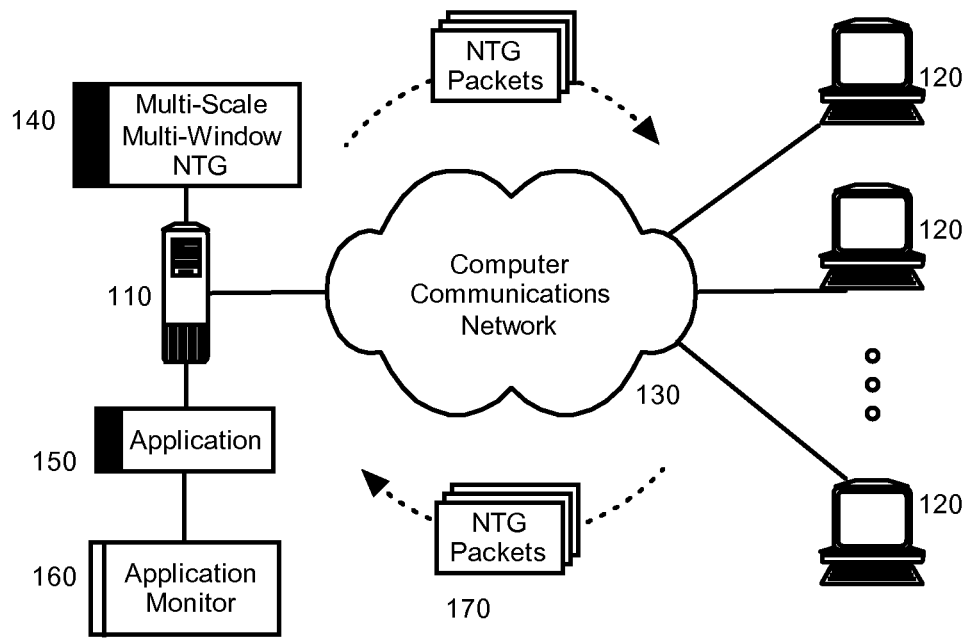
FIG. 1 is a pictorial illustration of a computer communications network configured with a multi-scale, multi-window network traffic generator.

In illustration, FIG. 1 is a pictorial illustration of a computer communications network configured with a multi-scale, multi-window network traffic generator. The system can include one or more client computing devices 120 coupled to a server host 110 over a computer communications network 130. The server host 110 can include a multi-scale, multi-window network traffic generator 140 configured to generate packets 170 emulating the self-similar nature of network traffic. An application 150 further can be coupled to the server host 110 (or to another server host) and an application monitor 160 can monitor the performance characteristics of the application 150 in response to the packets 170 of the network traffic generated by the multi-scale, multi-window network traffic generator 140.

Figure 2:
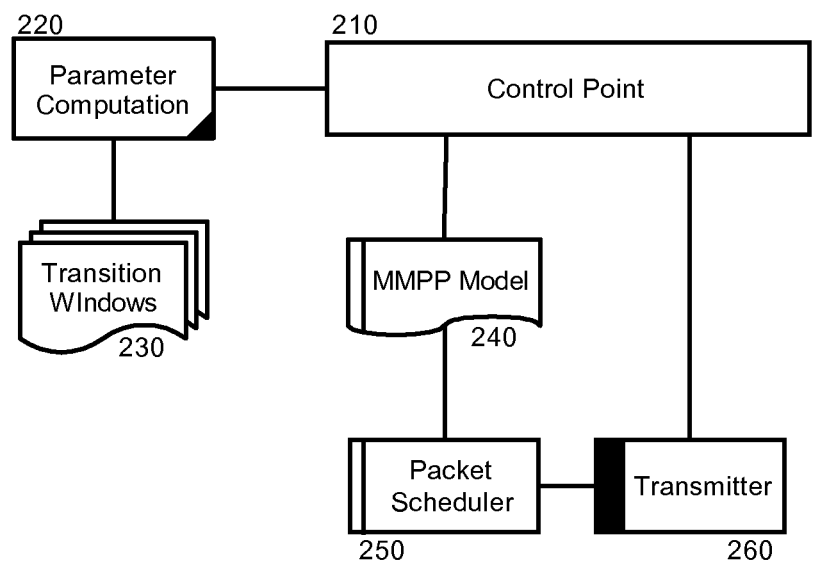
FIG. 2 is a schematic illustration of a multi-scale, multi-window network traffic generator.

The multi-scale, multi-window network traffic generator 140, as shown in FIG. 2, can include a control point 210 coupled to each of an MMPP model 240, parameter computation logic 220 and a packet transmitter 260. The MMPP model 240 in turn can be coupled to a packet scheduler 250 also coupled to the transmitter. The MMPP model 240 can include a multiplicity of states, each calibrated to represent a scale range in a time range. Each state can be exponentially distributed with transition probabilities for transitioning from an idle state to a burst state, and from a burst state to an idle state.

The transition probabilities can be organized into a probability transition matrix and when provided a desired traffic pattern, the matrix can produce a selected one of the transition windows 230 for use generating real-time network traffic. In this regard, the parameter computation logic 220 can compute an inter-arrival time for each of the burst of bursts that varies from one burst of bursts to the next. In this regard, multiple transition windows 230 can be provided as $\tau_i = [\rho_{min}^i, \rho_{max}^{i+1}]$, each iteration of the multiple transition windows 230 providing for three possible cases: (1) $\rho_i > \rho_{min}^1$ in consequence of which a packet is to be generated with an inter-packet time in the bursty state; (2) $\rho_i < \rho_{max}^2$ in consequence of which a packet is to be generated with an inter-packet time in the idle state; and $\rho_{max}^2 < \rho_i < \rho_{min}^1$—the gap between two states within the transition window in consequence of which no packet is to be generated.

Thus, each of the transition windows 230 can generate packets with an inter-packet time distribution determined by the parameters $\mu_1, \mu_2, \ldots, \mu_n$ corresponding to each of the states $P_1, P_2, \ldots P_n$ where $\mu$ is the mean parameter and P is the distribution for a burst of bursts. Each burst of bursts can be scheduled within the packet scheduler 250 for a different scale of self-similar traffic and transmitted by the transmitter 260 into the target network. Thereafter, the pattern of burst of bursts can repeat for the number of scales selected.

Figure 3:
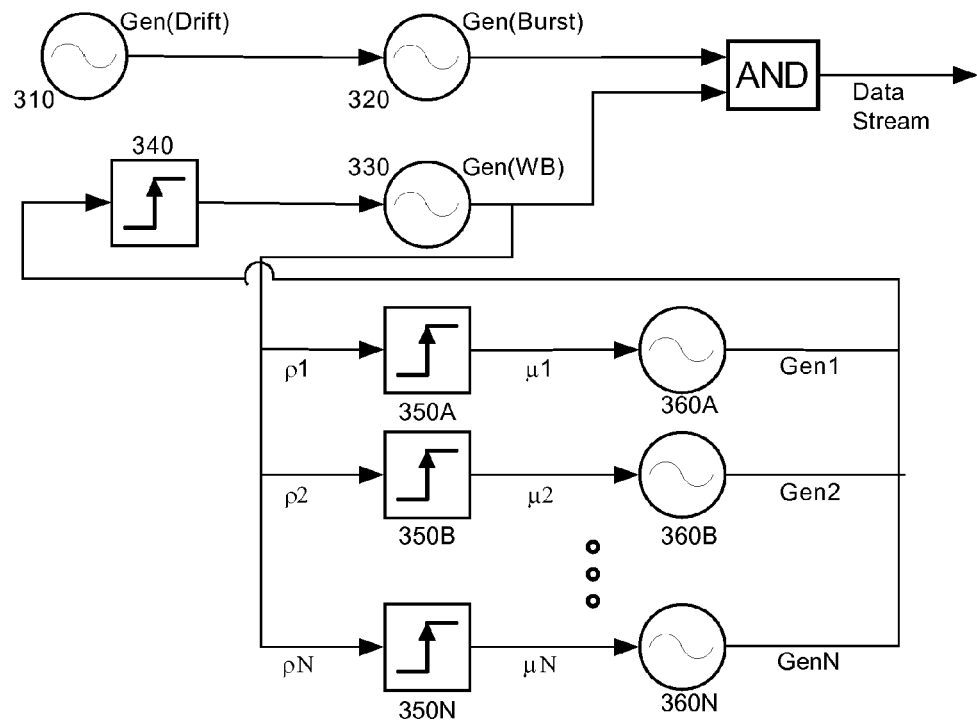
FIG. 3 is a block diagram illustrating a multi-scale, multi-window network traffic generator; and, FIG. 4 is a flow chart illustrating a process for the multi-scale, multi-window generation of network traffic.

In more particular illustration, FIG. 3 is a block diagram illustrating a multi-scale, multi-window network traffic generator. As shown in FIG. 3, the traffic generator can include a burst generator 320 driven from a spread generator 310 which provides for variability within a packet burst 340. A burst window generator 330 further can be provided that can define the duration (width) of a packet burst 340. Finally, one or more idle state generators 350A, 350B, 350N can provide one or more idle state generators 360A, 360B, 360N that provide idle state gaps for n-scales of long-range dependent traffic in a packet burst 340. More importantly, each of the idle state generators 360A, 360B, 360N provide the mean parameters with some variability included for realism and the probability distribution for the packet burst 340.

Figure 4:
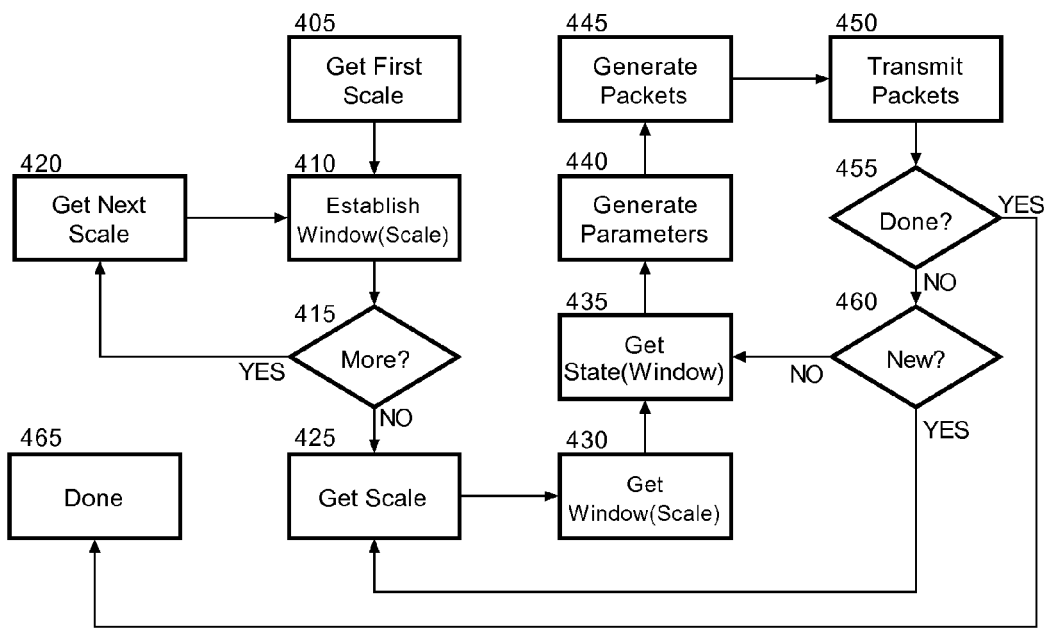

In even yet further illustration, FIG. 4 is a flow chart illustrating a process for the multi-scale, multi-window generation of network traffic. Beginning in block 405, a first scale can be selected for processing. In block 410, a transition window can be defined for the scale. In decision block 415, if additional scales remain to be processed, in block 420 a next scale can be selected for processing an a new transition window can be established for the next scale. This portion of the process can repeat until a set of transition windows have been established for the desired set of scales. Thereafter, the process can continue through block 425.

In block 425, a scale within the set of scales can be selected for processing. In block 430, a window can be retrieved for the selected scale and in block 435, a state can be determined according to the retrieved window. Thereafter, in block 440, the packet generation parameters can be generated for the determined state and in block 445, a burst of bursts can be generated utilizing the parameters. Finally, in block 450 the burst of bursts can be transmitted and in decision block 455, if the process has not completed, in decision block 460 it can be determined whether to change scale. If so, a new scale can be selected in block 425 and the process can repeat through block 430. When no additional traffic is to be generated, the process can terminate in block 465.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A network traffic generation method comprising:
defining multiple, different scales in an n-state Markov modified Poisson process (MMPP) model to accommodate a full characteristic response of a modeled traffic scenario;
organizing different transition probabilities into a probability transition matrix correlating different transition probabilities with respectively different states of the MMPP model, the matrix responding to a desired traffic pattern by producing a selected one of a multiplicity of transition windows for use in generating real-time network traffic;
submitting a traffic pattern to the matrix in order to receive a corresponding one of the transition windows;
determining a state from the corresponding one of multiplicity of transition windows;
computing an inter-packet time according to the determined; and,
generating and transmitting packets utilizing the computed inter-packet time in a multi-scale, multi-window network traffic generator executing in memory by a processor of a server host and configured to generate packets emulating the self-similar nature of network traffic.

2. The method of claim 1, wherein a transition window is established for each of the scales according to $\tau_i=[\rho_{min}^i, \rho_{max}^{i+1}]$.

3. The method of claim 2, wherein the state is determined through the transition window for selected ones of the scales, by comparing a random probability distribution $\rho_i$ to the transition window $\tau_i=[\rho_{min}^i, \rho_{max}^{i+1}]$ determine the state according to $\rho_i > \rho_{min}^1$, in consequence of which a packet is to be generated with an inter-packet time in a bursty state, $\rho_i > \rho_{max}^2$ in consequence of which a packet is to be generated with an inter-packet time in an idle state; and $\rho_{max}^2 < \rho_i < \rho_{min}^1$ in consequence of which no packet is to be generated.

4. A network traffic generation system comprising:
a computer with memory and at least one processor;
a Markov modified Poisson process (MMPP) model stored in the memory;
a packet scheduler coupled to the MMMP model and executing in the computer;
a data store of transition windows defined for different defined scales coupled to the computer;
a probability transition matrix disposed in the data store and organizing different transition probabilities in correlation with respectively different states of the MMPP model, the matrix responding to a desired traffic pattern by producing a selected one of a multiplicity of transition windows for use in generating real-time network traffic;
traffic generation parameter computing logic stored in a memory comprising program code enabled upon execution within the memory by the processor of the computer to compute traffic generation parameters for different scales according to respective states identified within different transition windows in the data store for the different scales by submitting a traffic pattern to the matrix in order to receive a corresponding one of the transition windows, by determining a state from the corresponding one of multiplicity of transition windows, by computing an inter-packet time according to the determined state and by generating and transmitting packets utilizing the computed inter-packet time; and,
a packet transmitter coupled to the packet scheduler and also executing in the computer.

5. A computer program product comprising a non-transitory computer readable storage device including computer usable program code for network traffic generation, the computer program product including:
computer usable program code for defining multiple, different scales in an n-state Markov modified Poisson process (MMPP) model to accommodate a full characteristic response of a modeled traffic scenario;
computer usable program code for organizing different transition probabilities into a probability transition matrix correlating different transition probabilities with respectively different states of the MMPP model, the matrix responding to a desired traffic pattern by producing a selected one of a multiplicity of transition windows for use in generating real-time network traffic;
computer usable program code for submitting a traffic pattern to the matrix in order to receive a corresponding one of the transition windows;
computer usable program code for determining a state from the corresponding one of multiplicity of transition windows;
computer usable program code for computing an inter-packet time according to the determined state; and,
computer usable program code for generating and transmitting packets utilizing the computed inter-packet time in a multi-scale, multi-window network traffic generator executing in memory by a processor of a server host and configured to generate packets emulating the self-similar nature of network traffic.

6. The computer program product of claim 5, wherein the transition window is established for each of the scales according to $\tau_i=[\rho_{min}^i, \rho_{max}^{i+1}]$.

7. The computer program product of claim 6, wherein the state is determined through the transition window for selected ones of the scales, by comparing a random probability distribution $\rho_i$ to the transition window $\tau_i=[\rho_{min}^i, \rho_{max}^{i+1}]$ to determine the state according to $\rho_i > \rho_{min}^1$ in consequence of which a packet is to be generated with an inter-packet time in a bursty state, $\rho_i < \rho_{max}^2$ in consequence of which a packet is to be generated with an inter-packet time in an idle state; and $\rho_{max}^2 < \rho_i < \rho_{min}^1$ in consequence of which no packet is to be generated.

* * * * *